Aug. 21, 1962     M. D. TROYER     3,050,285
METAL LOGGING SPAR
Filed July 20, 1959     4 Sheets-Sheet 2
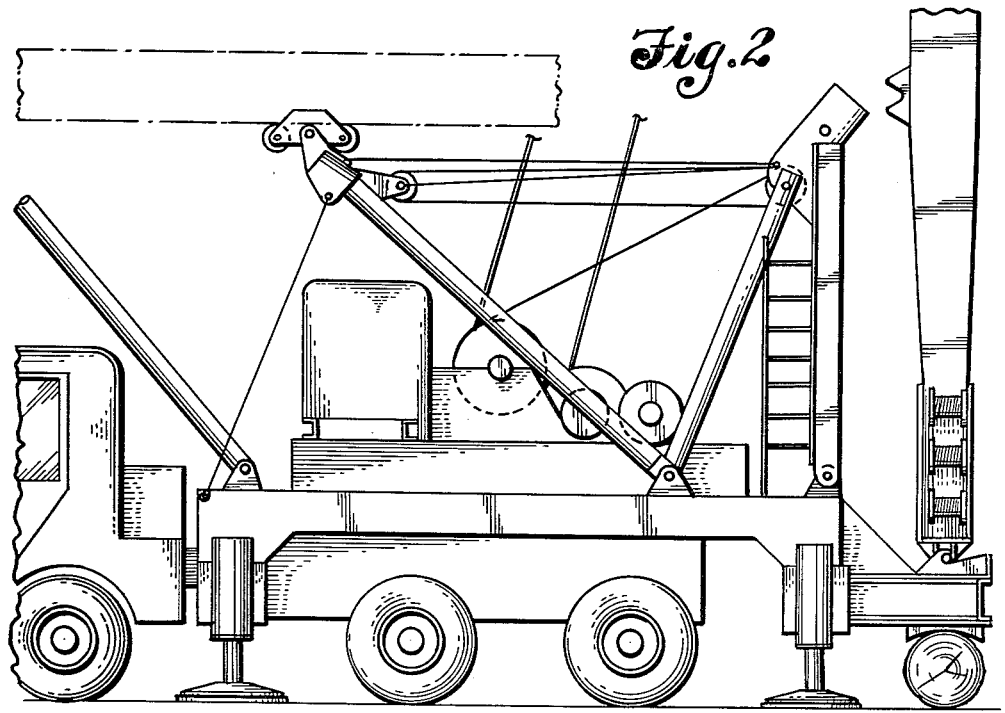
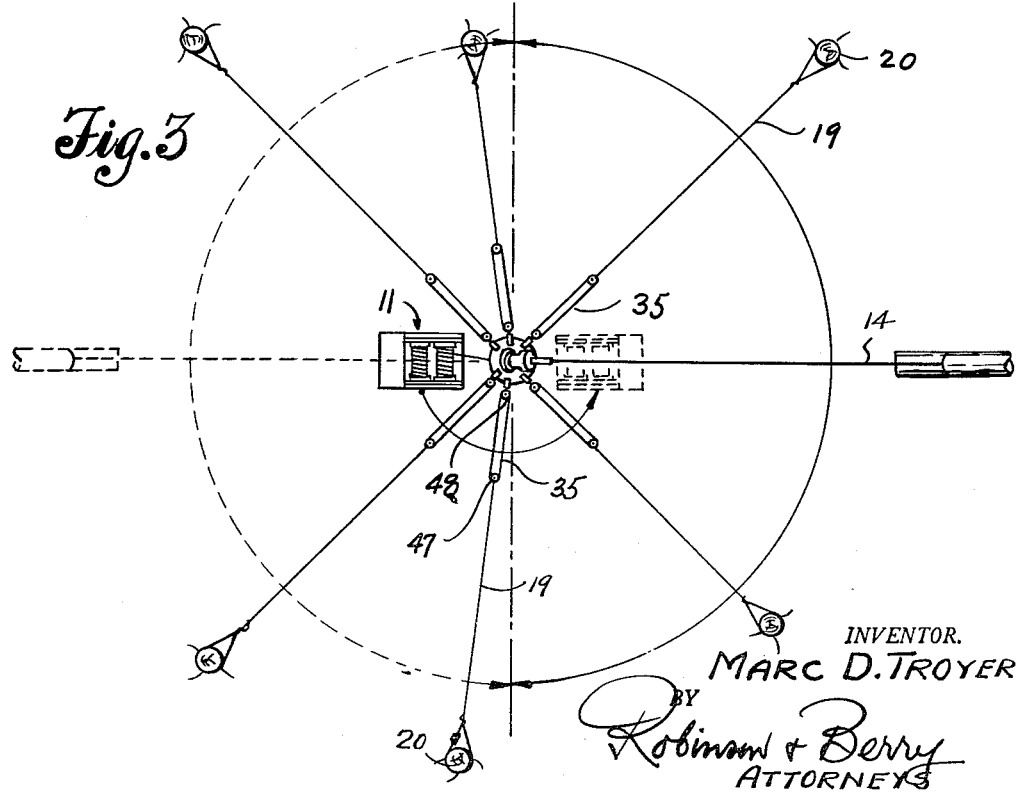
INVENTOR.
MARC D. TROYER
BY Robinson & Berry
ATTORNEYS

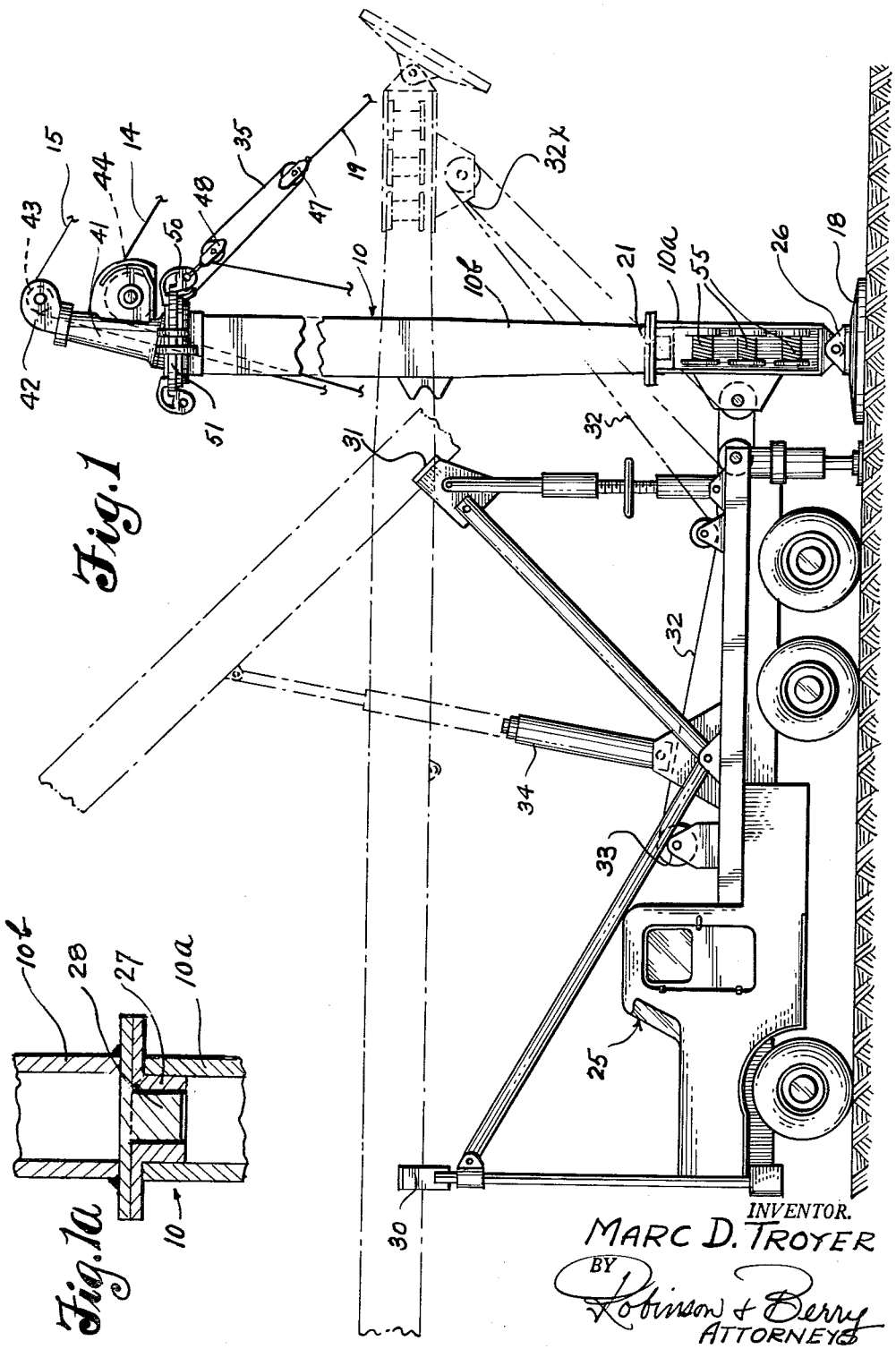

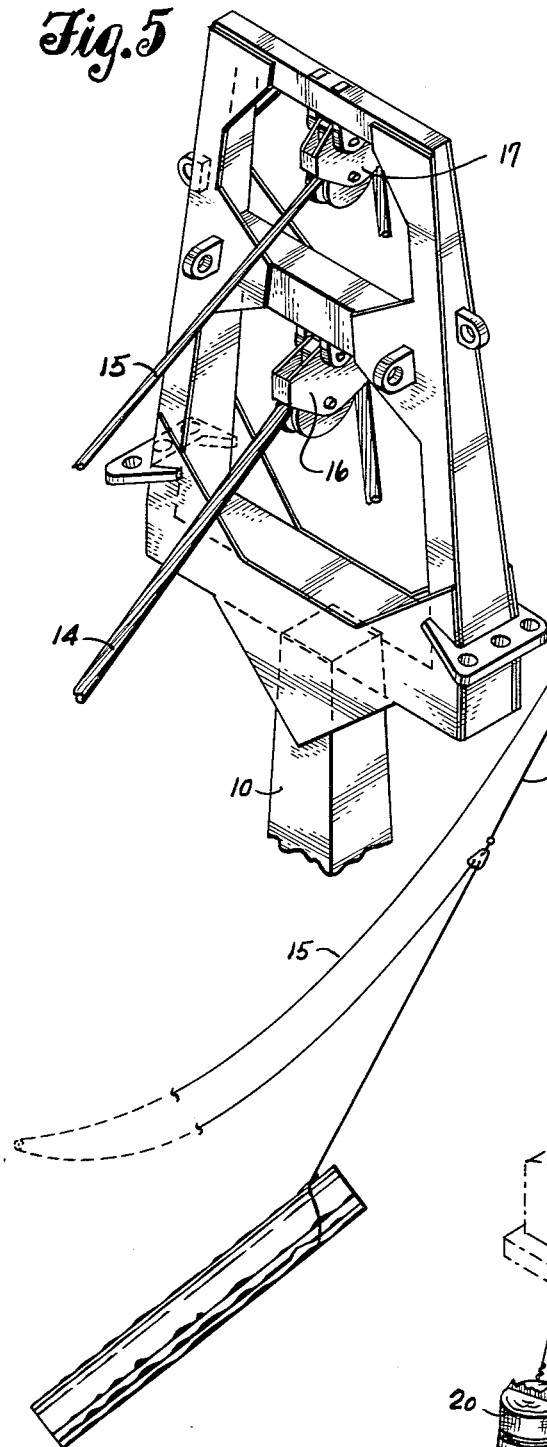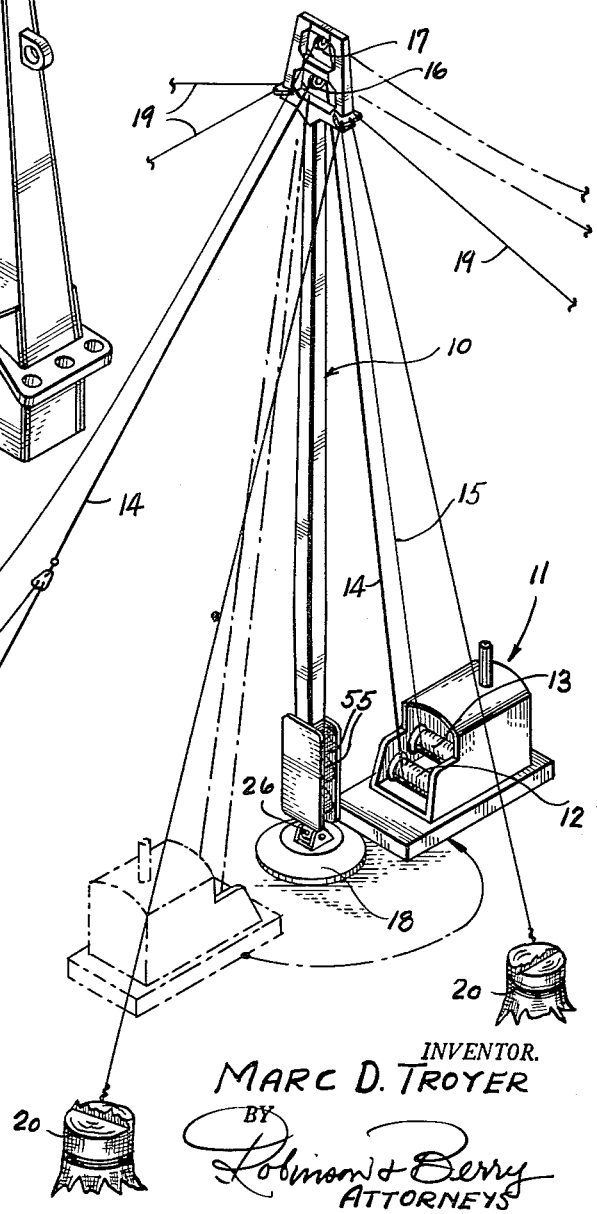

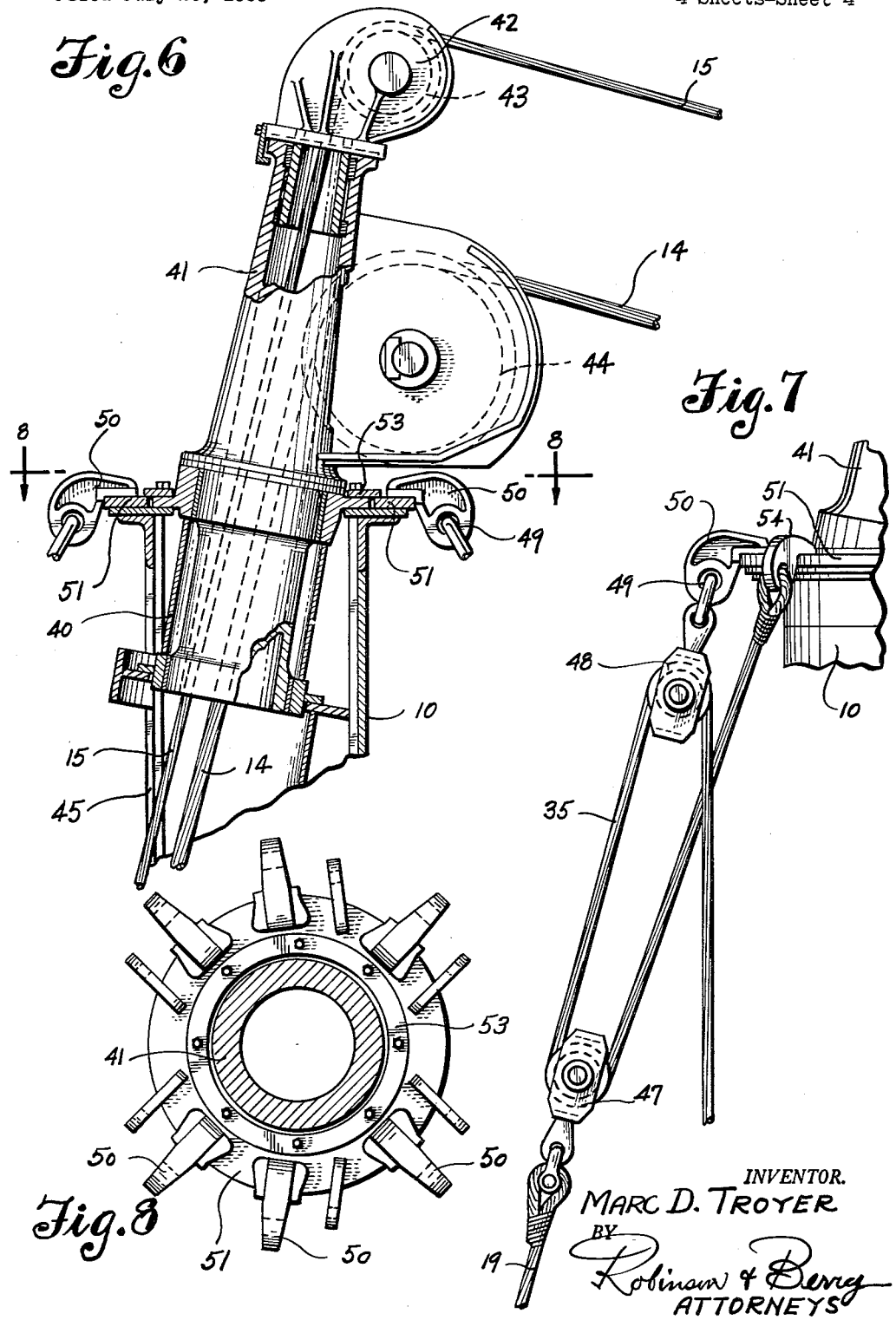

United States Patent Office 3,050,285
Patented Aug. 21, 1962

3,050,285
METAL LOGGING SPAR
Marc D. Troyer, Seattle, Wash., assignor to Berger Industries Incorporated, a corporation of Washington
Filed July 20, 1959, Ser. No. 828,185
2 Claims. (Cl. 254—139.1)

This invention relates to improvements in logging operations and equipment therefore and has reference, more particularly, to improvements in portable spars and to the manner or mode of their use in a logging operation employing a "high lead" or a similar cable system.

In typical logging operations, as previously carried on in the Pacific Northwest of the United States, suitable spar trees were selected and rigged for logging. In recent years, logging has been carried back farther and farther into the hills and it has become increasingly more difficult to find suitable spar trees. Furthermore, operating costs have increased many fold and this, along with the lack of spar trees has given rise to the use of portable, fabricated spars that are horizontally transported from place to place by truck, tractor, or sled and are then erected and guyed at the selected places of use.

A United States patent issued to R. G. Priest, on April 30, 1957, under No. 2,790,622, discloses use of a portable spar for log yarding and it is further disclosed in that patent that, in its use, the spar is erected upon its transporting vehicle. Also, it is therein shown that the same vehicle mounts the yarder engine as well as a means for supporting the spar in its "down" position for transportation and for use in the erection of the spar.

It will be understood, especially, by persons who are familiar with such logging operations, that, with the spar and yarder both mounted on the transporting vehicle, the arc of yarding about the spar, without a re-setting, is confined to about 200°. It will further be understood that equipment used in this operation is exceedingly heavy and costly by reason of the particular construction of the portable spar; its means for and mode of erection and its guying means and, furthermore, by reason of the fact that the yarder engine is permanently mounted on the spar conveying vehicle. In those instances where the spar and yarder engine are mounted for use on and are transported by the truck or tractor, it is apparent that this vehicle cannot be used for any other hauling purpose as long as the logging operation lasts.

In view of the great expense of such logging equipment, including the spar transporting vehicle, and means applied thereto for erection and support of the erected spar and the associated yarder engine, and also by reason of the fact that the vehicle is confined to the one specific use while a logging operation is being carried on, it has been the primary object of this invention to provide a portable, fabricated spar that can be moved on a truck, sled, or comparable vehicle, to a place of use, and there erected directly upon the ground, apart from the transporting vehicle so as to free the vehicle for other uses during the log yarding operation, which, as now contemplated, can be carried on by a yarder engine, which, also, might be, but not necessarily so, transported to the logging area on the same vehicle as that used for transporting the spar.

It is a further object of the invention, by reason of novel spar details, to eliminate the usual practice of logging one arcuate portion of the area about the spar, then lowering the spar onto the transporting vehicle, turning the vehicle and spar, re-erecting and again rigging the spar for the logging of the remaining arcuate portion of the area about the spar. Incidentally, in typical logging locations, using the portable spar, this turning of the spar as lowered onto the transporting vehicle may require traveling several miles for an open or turning space. In any event, the turning and re-rigging operation is an expensive and time consuming operation that for many reasons, is desirable to avoid.

It is also an object of this invention to provide improvements in the portable spar itself, which better adapts it for its particular mode of use and eliminates the requirement for its being lowered or moved in order to axially rotate it for 360° yarding at any setting.

Still further objects of this invention reside in the details of construction of the spar; in its mode of operation and in those various novel features that will become apparent as this specification progresses.

In accomplishing the above mentioned and other objects of the invention, I have provided the improved details of construction the preferred forms of which are illustrated in the accompanying drawings, wherein—

FIG. 1 is a side view of a portable spar transporting and erecting truck used in the present logging operation; also showing a spar in its erected position and resting upon the ground in accordance with the teaching of this invention.

FIG. 1a is an enlarged, sectional detail of the swivel joint in the spar, near its lower end, that permits axial turning of the top structure of the spar.

FIG. 2 is a side view of a form of spar transporting truck, as heretofore used, and here shown to illustrate the supporting of the erected spar and yarder engine on the transporting truck in accordance with previous practices.

FIG. 3 is a plan view of a guyed spar of the present invention and associated yarder engine illustrating the 180° extent of logging about the spar for each of the two settings of the yarder engine.

FIG. 4 is a perspective view, illustrating the guying of a spar and the application of the cables thereto for the yarding of logs; this spar being rested on the ground surface, instead of on the vehicle, and being equipped with a "banjo" type head or "top structure."

FIG. 5 is an enlarged perspective view of a "banjo" type top or head structure, applied to the spar of FIG. 4.

FIG. 6 is an enlarged elevation of the upper end or top structure of an alternative form of construction, particularly illustrating the swivel mounting of the fairleader sheaves which carry the haul back and main lines, as extended from the yarder engine cable drums.

FIG. 7 is a perspective view showing a portion of a spar and the tackle for tensioning one of the guy lines extended to the spar.

FIG. 8 is a horizontal section, taken on line 8—8 in FIG. 6.

Referring more in detail to the drawing:

The present invention has to do with a specific mode of use of a portable spar; the association of the spar with a yarder engine and its various cables or lines; a vehicle on which the spar may be transported from place to place for use and the means on the vehicle for the erection and laying down of the spar. In FIG. 4, one form of portable spar, as contemplated by this invention, is designated in its entirety by reference number 10. The yarder engine associated therewith is designated general by reference numeral 11, and as here shown, is equipped with cable winding drums 12 and 13 from which, respectively, the "main line" 14 and "haul back line" 15 are extended to pass over suitable sheave wheels 16 and 17, mounted in the upper end or top structure of the spar, for the yarding of logs in the usual way. Also, in this view, it is to be observed that the spar 10 is rested at its lower end on a circular base plate, 18, or what might be any other suitable form of support, that rests flatly upon the ground. The spar is guyed in its erected position by a plurality of guy lines 19 that have their inner ends attached to the upper end structure of the spar as presently more fully explained and at their outer ends are anchored to stumps, as at 20.

Heretofore, as previously stated, it has been a practice, in comparable logging operations, to erect the portable spar 10 upon the spar transporting vehicle, after the fashion illustrated in FIG. 2, but in such a case, the transporting vehicle cannot be put to any other use so long as the logging operation is being carried on. It is now fully recognized that it is quite uneconomical and also impractical to so tie up the use of such costly automotive equipment which might be used for example, for the transporting and rigging up of spars at various other places, or for any one of the many tasks required of such trucks that are incident to a logging operation. It has also been quite effectively demonstrated that where the portable spar is erected on the transporting vehicle, the required "lay down" of the spar; the "turn around" operation and then the necessary re-erecting and re-rigging for yarding at each re-setting at the same location, is time consuming and far more costly than if only the re-positioning of a yarder engine, relative to an already erected and guyed spar, is required.

In view of the above explanatory remarks, the present invention has been characterized by the use of a portable spar 10 that is designed for resting, when erected, upon the ground and which in one form, as in FIG. 1, for example, is relatively rotatable so that its head or top structure will accommodate itself at any single setting of the spar, for the yarding of logs from various directions or angles through the full arc of 360° about it, necessitating only the usual re-setting of the yarder engine to cover the full circle served by the spar; such re-setting requiring a relatively short time and is not a difficult or expensive operation as compared to that for spar re-setting.

The invention further contemplates that the portable spar may be transported to its place of use on an automotive vehicle, such as for example, the truck 25 of FIG. 1, or on a suitable tractor and that any suitable means be carried on the transporting vehicle for the upending or erection of the spar. Such a mechanism might correspond to that shown in the previously mentioned patent, No. 2,790,622, to R. G. Priest, or it might be any other suitable means. However, the present invention differs from the method of use and ideas expressed in the Priest patent, in that, the spar 10 is erected on a base plate 18 that in turn, rests flatly upon the ground; the spar being rested centrally upon and joined to said plate by a universal coupling mechanism designated by numeral 26 in FIGS. 1 and 4. Still further differences and novel features will later be described.

The preferred form of portable spar to be used in this instance, is a two piece, tubular, metal fabrication, round or rectangular in cross-section, joined by a swivel form of joint as at 21, of the general character of that shown in FIG. 1a, in which the section 10a below the swivel is fitted a sleeve 27, and the section 10b, above the swivel joint, has a downwardly directed cylindrical stem 28 that is rotatably fitted in the sleeve 27. The swivel joint may be formed at any convenient position above the guy line drums 55 as mounted on part 10a. This permits the upper end or main section 10b of the spar to be axially rotated relative to the lower or base section 10a, so that the top structure of the spar can adapt itself to the location of the yarder engine and the arc of the yarding operation.

Referring now to FIG. 1: Assuming that a spar 10 has been transported on the truck 25 in a horizontal position, resting in the carrying seats 30 and 31 shown in that view, it is then erected at the selected location by the winding in of cable 32, that has one end dead ended to the base of the spar, as at 32x, and its other end wound on a cable winding drum 33 carried on the truck while at the same time a lifting force is exerted upwardly against the spar at a point forwardly of its rear support by a jack or hydraulic cylinder 34, thus to lift the spar to a vertical position as its lower end plate 18 engages flatly against the ground.

With the spar 10 thus erected, it is guyed in its upright position by a plurality of guy lines 19 attached to its upper end; these guys being anchored at their outer ends to stumps, or the like, and at their inner ends may be joined to the upper end or top structure of the spar by the usual guy line tensioning tackle lines 35, as shown in FIG. 7 or by other suitable means. The spar 10, in this instance, may have an upper end structure of the "banjo" type, as shown in FIG. 5, or it might have the present preferred structure, as seen in FIG. 6. The "banjo" type head structure of FIG. 5 is similar to that of the Priest patent in that it is rigidly fixed to the upper end of the spar. However, the present preferred head structure, seen in FIG. 6, comprises a tubular bearing structure 40 that is fixed in the upper end portion of the tubular or hollow body of the upper section of the spar and is upwardly and rearwardly inclined, and in which bearing structure 40 the lower end portion of a tubular stem 41 is mounted for the axial swiveling action of said stem. At its upper end, the stem mounts a sheave block 42 for swivel action thereon and this block mounts a sheave wheel 43 therein. Also mounted by the stem 41, at its rear side, is a sheave wheel 44. When this top structure is employed, the main line and haul back line, respectively, extend upwardly and rearwardly from the cable winding drums 12 and 13, to pass through an opening 45 in the forward side of the upper end section of the tubular spar 10, then directly through the tubular stem 41 and over the sheave wheels 43 and 44 as carried by the stem. It is to be understood that, in this arrangement of parts, no cable guiding fair leaders, sheaves, or the like, are required between the drums 12 and 13 and the sheave wheels 43 and 44.

In the use of this spar, each of the guy line tensioning cables 35 as applied to the inner ends of the several guy lines 19, as seen in FIG. 7, extend about a pair of pulley blocks 47 and 48, one of which is attached to the inner end of a guying cable 19 and the other of which is attached, as at 49 in FIG. 7, to an ear 50 that is welded to a flat slip ring 51 that is mounted rotatably on the upper end of the spar 10 between an annular base plate 52 and an overlying ring 53, as has been illustrated in FIG. 6. One end of cable 35 is anchored to a bracket 54, welded to ring 51 and its other end is extended to cable winding means, as at 55, in FIG. 1, on the lower end of the spar. With the spar so guyed, it may be axially rotated without any change in the relationship of the guy lines 19 to each other or interference with their proper functioning.

With the spar 10, equipped with a top end structure like that of FIG. 6, so erected, guyed and rigged for yarding of logs, and the yarder engine 11 anchored for use in a suitable location in the usual way, the yarding of logs can be carried on through an arc of from 180° to 200°. When this arc has been logged, the yarder engine is shifted to the opposite side of the spar, as has been indicated in its showing in FIG. 4, and the remaining portion of the circle is logged in a like manner. It is quite significant that, with this change in setting of the yarder engine, no re-setting of the spar is necessary; it being required only that the upper end section of the spar be axially rotated in accordance with the new position of the yarder so that the lines 14 and 15 shall lead directly upward therefrom through the tubular stem 41 to the sheave wheels 43 and 44. The fact that the re-setting of the yarder requires no dismounting or re-guying of the spar is one of the important features of the mode of use of this spar. It is materially less expensive; less time consuming and makes possible a speed-up in logging operations. The rotation of the top structure of the spar, as seen in FIG. 6, is readily accomplished incident to the re-setting of the yarder engine.

The first step is to wind in the main and haul back lines onto their respective drums and using a "straw line" for replacing the lines through the sheaves. After the main and haul back lines are removed, the upper section 10b of the spar may be rotated so that the fairleader structure leads in the desired direction. The yarder having been moved to the new location, the main and haul back lines are then reeved through the sheaves 43 and 44 and the equipment is again ready for use. There is no change in the position of the guy lines because the spar is merely rotated at the swivel joint 21 and within the ring 51. It is not necessary to lower the spar. The change is accomplished within a short period of time and no special spar raising and lowering equipment is required. This all results in a substantial saving in both time and money.

If a spar 10 that is equipped with the "banjo" type top structure is used, then the spar structure need not be rotated but instead, the main line and haul back line are re-threaded through the respective sheaves carried at its upper end from the opposite direction. Furthermore, it is not necessary that the spar be axially rotated.

While the gist of the present invention resides in the use of a portable spar by resting it on the ground instead of mounting it on the truck or transporting vehicle, the details of construction of the spar for axial rotation of its upper end section and top structure are also of importance and are features of the invention.

The importance of the present invention may be more readily apparent when one considers the size and cost of the particular equipment involved. The fabricated metal spar ranges in length from about sixty to one hundred twenty feet. The weight of the spar ranges from five to fifteen tons and the spar, guying mechanism, and fairleader are sold for approximately $20,000.00. If the spar is mounted on a truck, as illustrated in FIG. 2, trailer or skid, this equipment may cost as much as $20,000.00 of which $10,000.00 is the cost of the spar raising and lowering mechanism. These amounts do not include the cost of the yarding drums and power unit mounted on the truck. The truck or trailer mounting ties up the equipment so that it cannot be used for other purposes when the spar is in use and it requires the expensive raising mechanism for each spar. When my new and improved spar is used, one truck or trailer, with the raising mechanism, can be used for transporting several spars to the desired location where they can be raised into working position. When the spar is raised, the truck can be employed for other uses as for setting other spars until it is desired to move the spar to another location. The time elapsing between moves may be weeks or even months. It is believed readily apparent that if a logging operator is yarding at six different locations, he can transport and raise six spars with one piece of equipment valued at $20,000.00. Whereas, if the spars are truck mounted, the operator would require five additional trucks, the total value of which would be in the neighborhood of $100,000.00.

It is well known that spar trees, natural trees or poles positioned by man, have been used for many years in yarding logs or other logging operations. However, it is believed that no one has heretofore designed a metal fabricated spar to mount directly on the ground and wherein means is provided for yarding in an arc of 360 degrees without requiring the lowering of the spar and again raising the spar and re-setting of the guy lines. With my new construction, the saving of time, which means money, and greater production are now made possible.

I claim:

1. In a cable logging system of the character described, a portable spar of spar tree height, a base member, means on the top side of said base member for the fixed support of said spar, said spar comprising a lower end section and an upper end section rotatably mounted on said lower section, means joining said lower and upper sections in a rigid swiveling connection, an upper end structure rotatably mounted by said upper section including rigging for the support and operation of logging cables thereover, and including a plurality of cable winding drums mounted in fixed position on the lower end section thereof, cable blocks rotatably mounted on the upper end section and spar guying cable wound on and extending from each of the drums and over a block for the guying of said spar.

2. The system recited by claim 1 wherein said upper end structure includes a tubular bearing fixed in the upper end section of the spar, an upwardly and rearwardly inclined tubular stem with its lower end portion rotatably mounted in said bearing and its upper end portion extended substantially thereabove, a sheave block mounted at the upper end of said tubular stem, a sheave wheel mounted for swiveling action by said block.

References Cited in the file of this patent
UNITED STATES PATENTS

| | | |
|---|---|---|
| 2,582,548 | Larson | Jan. 15, 1952 |
| 2,733,817 | Couse | Feb. 7, 1956 |
| 2,734,641 | Burton | Feb. 14, 1956 |
| 2,883,068 | McIntyre | Apr. 21, 1959 |